US011998938B2

(12) United States Patent
Workman et al.

(10) Patent No.: US 11,998,938 B2
(45) **Date of Patent: *Jun. 4, 2024**

(54) FIRE PROTECTION SPRINKLER GUARD

(71) Applicants: Viking Group, Inc., Caledonia, MI (US); Minimax Viking Research & Development GmbH, Bad Oldesloe (DE)

(72) Inventors: Martin H. Workman, Delton, MI (US); Gary William Pleyte, Hastings, MI (US); Scott T. Franson, Hastings, MI (US)

(73) Assignees: Viking Group, Inc., Caledonia, MI (US); Minimax Viking Research & Development GmbH, Bad Oldesloe (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/079,455

(22) Filed: Dec. 12, 2022

(65) Prior Publication Data

US 2023/0149963 A1 May 18, 2023

Related U.S. Application Data

(63) Continuation of application No. 17/615,656, filed as application No. PCT/US2020/037775 on Jun. 15, 2020, now Pat. No. 11,548,027.

(Continued)

(51) Int. Cl.

| | |
|---|---|
| ***B05B 15/16*** | (2018.01) |
| ***A62C 31/28*** | (2006.01) |
| ***A62C 35/68*** | (2006.01) |

(52) U.S. Cl.

CPC .............. *B05B 15/16* (2018.02); *A62C 31/28* (2013.01); *A62C 35/68* (2013.01)

(58) Field of Classification Search

CPC ......... B05B 15/16; B05B 15/14; B05B 1/185; B05B 15/65; A62C 31/00–28;

(Continued)

(56) References Cited

U.S. PATENT DOCUMENTS

| | | | |
|---|---|---|---|
| 44,577 | A | 10/1864 | Cross |
| 763,129 | A | 2/1904 | Tudor |

(Continued)

FOREIGN PATENT DOCUMENTS

| | | |
|---|---|---|
| WO | WO2019/090135 | 5/2019 |

OTHER PUBLICATIONS

International Searching Authority, International Search Report in International Appln. No. PCT/US2020/037775, Aug. 20, 2020, 16 pages.

(Continued)

*Primary Examiner* — Qingzhang Zhou
*Assistant Examiner* — Juan C Barrera
(74) *Attorney, Agent, or Firm* — Perkins Coie LLP

(57) ABSTRACT

Sprinkler guards to protect fire protection sprinklers in their installed and operative positions. A fire protection sprinkler guard includes a structure with a hinged arrangement to flexibly receive a fire protection sprinkler. A latch connection operates in combination with the hinge of the guard to form a rigid cage structure to shield and protect the sprinkler.

32 Claims, 3 Drawing Sheets

Related U.S. Application Data

(60) Provisional application No. 62/862,502, filed on Jun. 17, 2019.

(58) Field of Classification Search
CPC ... A62C 35/58–68; A62C 37/11; A62C 37/12; A62C 37/16; A62C 37/14; Y10T 24/00–51; Y10T 29/49826; F21V 15/02; F16L 3/1075; F16L 3/10
USPC .......................... 16/221–392; 239/288–288.5
See application file for complete search history.

(56) References Cited

U.S. PATENT DOCUMENTS

| | | | | |
|---|---|---|---|---|
| 1,469,336 | A | | 10/1923 | Rowley |
| 2,236,940 | A | | 4/1941 | Foley |
| 2,640,147 | A | | 5/1953 | Suchan |
| 3,797,746 | A | | 3/1974 | Gray et al. |
| 5,632,339 | A | | 5/1997 | Fenske et al. |
| 5,893,418 | A | * | 4/1999 | Ponte ..................... A62C 31/02 169/37 |
| 2007/0256844 | A1 | | 11/2007 | Blasing et al. |
| 2012/0267453 | A1 | | 10/2012 | Devaney |

OTHER PUBLICATIONS

The Viking Corporation, Technical Data, Specific Application ESFR Pendent Sprinkler VK514 (K28.0), Form No. F_010715, Apr. 17, 2019, Rev 19.3, 5 pages.
The Viking Corporation, Technical Data, Sprinkler Guards, Form No. F_012798, 18.10.11, Rev 16.1, P65, 3 pages.
Tyco Fire Products LP, Datasheet, Model EG-25 Sprinkler Guard for Model ESFR-25 Pendent Sprinkler, TFP 784, Dec. 2017, 2 pages.
Tyco Fire Products LP, Datasheet, Model G2 Sprinkler Guard, Model WS-2 Shield, and Model WSG-2 Sprinkler Guard with Shield Series ELO-231, ELO-231B, and ELO-231FRB Sprinklers, TFP 782, May 2009, 4 pages.
The Viking Corporation, Technical Data, Sprinkler Water Shields and Guards, Form No. F_061289, Mar. 29, 2018, Rev 18.1, 4 pages.

* cited by examiner

FIRE PROTECTION SPRINKLER GUARD

PRIORITY CLAIM & INCORPORATION BY REFERENCE

This application is a continuation application of U.S. patent application Ser. No. 17/615,656, filed Dec. 1, 2021, which is a 35 U.S.C. § 371 application of International Application No. PCT/US2020/037775, filed Jun. 15, 2020, which claims the benefit of U.S. Provisional Application No. 62/862,502 filed Jun. 17, 2019 each of which is incorporated by reference in its entirety.

FIELD OF THE INVENTION

The present invention relates generally to protection devices for fire protection sprinklers. More particularly, the present invention is directed to a sprinkler guard for protecting a sprinkler in its installed and operative position.

BACKGROUND OF THE INVENTION

Generally, automatic fire protection sprinklers include a frame for connection to a supply pipe of firefighting fluid and a deflection member coupled to the frame for distribution of the fluid to address a fire. The frame includes a formed body having an internal passageway with a fluid inlet for receipt of the fluid and a fluid outlet defining a discharge orifice from which the fluid is discharged. Externally formed about the sprinkler body proximate the outlet is a boss or enlarged formation for engagement by an installation tool such as a wrench to facilitate sprinkler installation. In an automatic sprinkler, the fluid discharge is automatically controlled by operation of a thermally responsive trigger or actuator that maintains a fluid tight seal at the discharge orifice by, for example, exertion of pressure on a sealing assembly disposed within the outlet. When the temperature surrounding the sprinkler is elevated within a range of the nominal temperature rating of the trigger, the trigger operates thereby permitting ejection and release of the sealing assembly and the discharge of fluid through the discharge orifice. The discharged fluid impacts the fluid deflection member and is distributed in a designed spray pattern and density in order to effectively address a fire and wet the surrounding area. Several factors can influence the water distribution patterns of a sprinkler including, for example, the installation orientation and the geometry of the fluid deflection member, the distance between the deflection member and the discharge orifice, and/or the shape of the sprinkler frame to which the deflection member is coupled. Accordingly, the fluid control, distribution and performance of an automatic sprinkler is dependent upon the integrity of the sprinkler assembly and its individual components.

Automatic sprinklers are installed in a variety of environments which can expose the sprinkler to accidental impact. For example, storage type automatic sprinklers can be installed in a storage warehouse beneath the warehouse ceiling and above the storage area and commodities to be protected. In the storage environment, stored commodities are stacked and moved by operating personnel or material handling equipment such as forklifts. The movement of material or mechanical equipment proximate to an installed automatic sprinkler exposes the sprinkler to possible accidental impact and damage. If the trigger of the sprinkler is damaged, water may discharge from the sprinkler; or if the deflector or frame is damaged, the sprinkler may not distribute fluid in the proper pattern.

It is well known to use a sprinkler guard to protect an installed sprinkler. Generally, the sprinkler guard includes a caged enclosure with one open-ended base. The guard is installed by sliding the guard over the sprinkler through the base so that the sprinkler is coaxially centered within the cage. The guard is affixed to the sprinkler by securing the open-ended base about the sprinkler body against the enlarged boss of the sprinkler body. Sprinkler guards are configured for protecting sprinklers installed in an upright orientation, in which fluid is discharged from the sprinkler body toward the ceiling and then redirected downward by the fluid deflection member toward the protection area or a pendent orientation. Sprinkler guards are also configured for protecting sprinklers installed in a pendent orientation, in which fluid is discharged downward to impact the fluid deflection member for distribution below the sprinkler over the protection area. In the case of suppression type sprinklers such as, for example, Early Suppression Fast Response (ESFR) fire protection sprinklers, a portion of the spray pattern is directed or thrusted axially downward below the sprinkler toward the area being protected. Illustrative examples of these known sprinkler guards are shown and described in U.S. Pat. Nos. 3,797,746; 5,632,339; and 5,893,418. Examples of commercially available sprinkler guards are shown and described in technical data publication *TFP*784: *Model EG*-25 *Sprinkler Guard For Model ESFR*-25 *Pendent Sprinkler* (December 2017) from Tyco Fire Products, LP and technical data publication Form F_012798: Sprinkler Guards (Oct. 11, 2018, Rev. 16.1) from Viking Corp.

Although these caged enclosures can protect a sprinkler, a design concern remains in ensuring that the cage structure itself does not interfere with or inhibit the fluid distribution performance of the sprinkler. This can be of particular concern where the cage structure or portion thereof is in the spray path directly below or proximate the sprinkler fluid deflection member. Accordingly, there remains a need for sprinkler guard structures that provide sufficient protection to a sprinkler while minimizing or eliminating interference with the spray pattern of the sprinkler. In addition, some of these known sprinkler guards present an installation complexity. More specifically, due to the single open end of the guard through which the sprinkler is inserted, there is limited flexibility when installing the guard about the sprinkler. This can be difficult when working around the surrounding pipe. In addition, some of these known guards use a sliding clip or ring to secure the guard about the sprinkler and require a specific installation tool which can add to the complexity in affixing the sprinkler guard to the sprinkler. Other known sprinkler guards, as seen for example in U.S. Pat. No. 1,469,336 use a hinged base at the open end of a wire sprinkler guard to secure the guard to the sprinkler body. Although the hinged base can swing open and closed about the sprinkler body, locating the sprinkler centrally within the guard still requires insertion of the sprinkler through the open end of the wire guard. Accordingly, there remains a need for a sprinkler guard that provides for a simplified and flexible manner of installation.

SUMMARY OF THE INVENTION

Preferred devices and methods to protect fire protection sprinklers are provided. Preferred embodiments of a fire protection sprinkler guard include a cylindrical structure with two guard portions in a hinged arrangement. The preferred hinge configuration of the sprinkler guard operates to flexibly receive a fire protection sprinkler. The hinged sprinkler guard defines an open state for receipt of the fire protection sprinkler and a closed state for surrounding and guarding the fire protection sprinkler. One preferred embodiment of the sprinkler guard includes a first guard portion having a first end and a second end axially spaced from one another with a first end plate disposed at the first end and a first grid of wire members affixed to the first end plate. A preferred second guard portion of the preferred sprinkler guard has a first end and a second end axially spaced from one another with a second end plate disposed at the first end of the second guard portion and a second grid of wire members affixed to the second end plate. The preferred sprinkler guard includes a hinged connection between the first guard portion and the second guard portion to pivot the first and second guard portions with respect to one another and define an open state of the sprinkler guard for receipt of the fire protection sprinkler and a closed state of the sprinkler guard to form a cage structure with a central guard axis for surrounding and guarding the fire protection sprinkler.

Preferred embodiments of the sprinkler guard include a latched configuration that operates in combination with the hinge of the guard to form a rigid cage structure to shield and protect the sprinkler from lateral impact. Additionally, preferred embodiments of the guard are configured for pendent-type fire protection sprinklers. The preferred sprinkler guard includes an open end that circumscribes the sprinkler proximate its fluid deflection member leaving the path below the sprinkler unimpeded so as to minimize or eliminate interference with the fluid distribution spray pattern of the protected sprinkler.

A preferred embodiment of a sprinkler guard having a central guard axis includes a first guard portion having a first end, a second end axially spaced from one another and a first end plate disposed at the first end. A second guard portion has a first end, a second end axially spaced from one another and a second end plate disposed at the first end. A preferred plurality of hinged connections between the first and second guard portions are axially aligned with one another, radially spaced from and extending parallel to the central guard axis. The plurality of hinged connections defines an open state of the sprinkler guard for receipt of a fire protection sprinkler and a closed state of the sprinkler guard for surrounding and guarding the fire protection sprinkler. In a closed state of the sprinkler guard, the first ends of the first and second guard portions circumscribe the central guard axis to define a first end of the sprinkler guard with the first and second end plates disposed for cooperatively engaging a body of the fire protection sprinkler. The second ends of the first and second guard portions circumscribe the central guard axis in the closed state of the guard to define a second end of the guard axially spaced from the first end of the guard portions.

Another preferred embodiment of a sprinkler guard includes a first guard portion having a first end, a second end axially spaced from one another and a plurality of eyelets axially aligned with one another between the first and second ends of the first guard portion. The preferred guard also includes a second guard portion having a first end, a second end axially spaced from one another and a plurality of pins axially aligned with one another between the first and second ends of the second guard portion. In the preferred guard a plurality of hinged connections between the first and second guard portions are defined by each of the plurality of eyelets being engaged by one of the plurality of pins. The plurality of hinged connections are preferably axially aligned with one another, radially spaced from and extending parallel to the central guard axis, the plurality of hinged connections defining an open state of the sprinkler guard for receipt of a fire protection sprinkler and a closed state of the sprinkler guard for surrounding and guarding the fire protection sprinkler. In the closed state of the sprinkler guard, the first ends of the first and second guard portions circumscribe the central guard axis to define a first end of the sprinkler guard, and the second ends of the first and second guard portions circumscribing the central guard axis to define a second end of the guard axially spaced from the first end of the guard. Other preferred embodiments of the sprinkler guard include a plurality of latch connections in which another plurality of eyelets is engaged by a plurality of latch pins. The latch connections preferably form a frictional engagement such that the closed state of the sprinkler guard forms a rigid structure.

Preferred methods of protecting a fire protection sprinkler include obtaining or providing a sprinkler guard having a first guard portion and a second guard portion with each guard portion having a first end with an end plate and grid of wire members affixed to the end plate. The preferred methods include pivoting the first and second guard portions with respect to one another between an open state of the sprinkler guard for receipt of the fire protection sprinkler and a closed state of the sprinkler guard for forming a cage structure with a central guard axis for surrounding and guarding the fire protection sprinkler. A preferred method of protecting a fire protection sprinkler includes obtaining a sprinkler guard that includes a first end, a second end and a plurality of hinge connections axially aligned with one another between the first and second ends that operate to define an open state of the sprinkler guard and a closed state of the sprinkler guard. The preferred method also includes providing the sprinkler guard to protect an installed fire protection sprinkler.

Preferred embodiments of the sprinkler guard provide for a simplified and flexible structure for installation about a fire protection sprinkler. Preferred embodiments of the sprinkler guard include a first end and a second end axially spaced from one another along a central guard axis. The preferred guard defines an internal space between the first and second end for housing the fire protection sprinkler; and a hinged connection between the first and second ends for operation along a pivot axis radially spaced and parallel to the central guard axis such that each of the first and second ends of the guard hinge open about the pivot axis to receive the fire protection sprinkler.

BRIEF DESCRIPTION OF THE DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

DETAILED DESCRIPTION OF THE INVENTION

Figure 1:
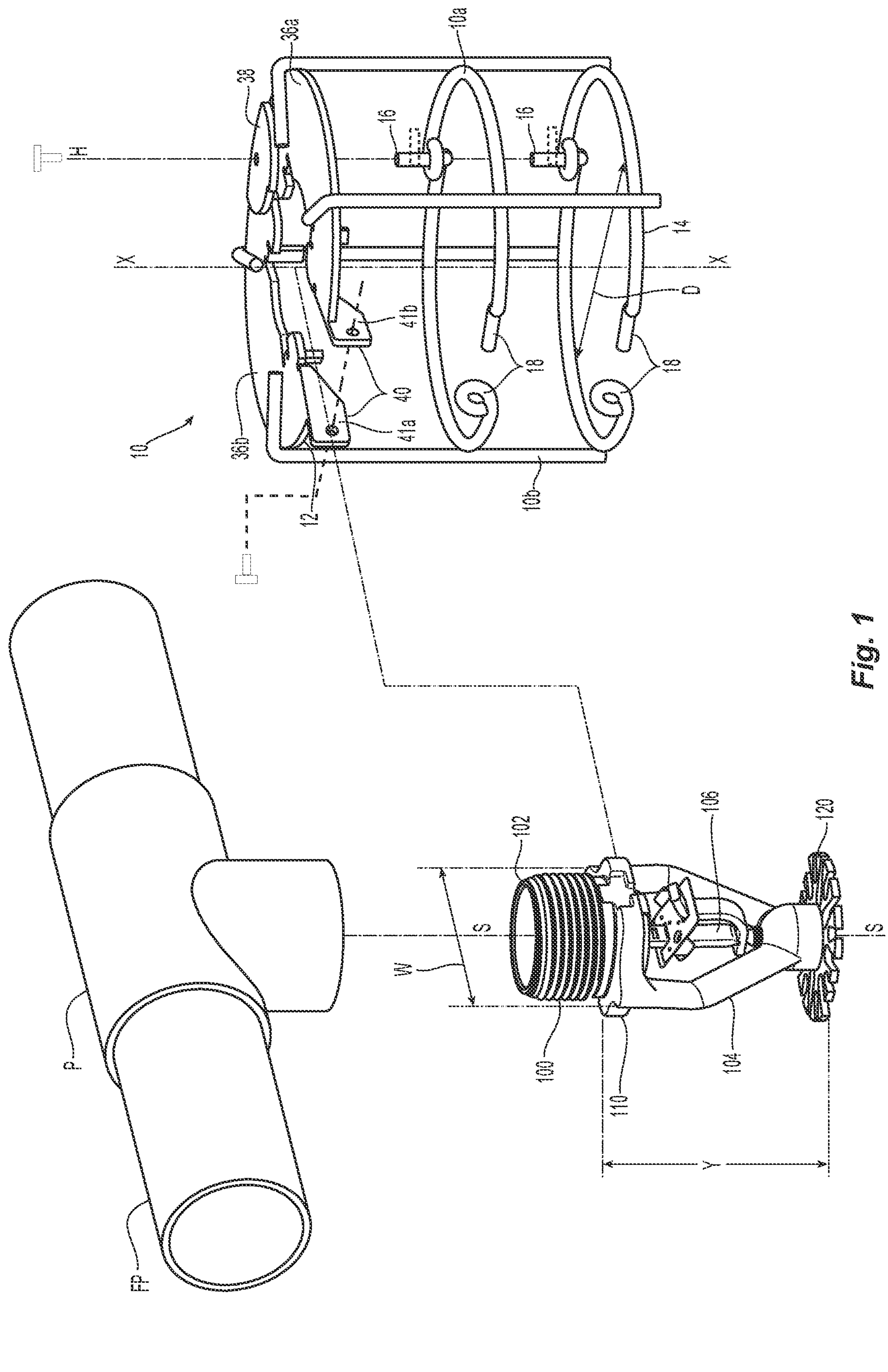
FIG. 1 is a schematic exploded perspective view of a preferred embodiment of a sprinkler guard to protect an installed fire protection sprinkler.

Shown in FIG. 1 is a preferred embodiment of a sprinkler guard 10 for the protection of a fire protection sprinkler, such as for example, sprinkler 100. The sprinkler guard 10 has a first end 12 and a second end 14 axially spaced from the first end 12 along a central guard axis X-X. Preferred embodiments of the guard 10 define an internal space between the first and second ends 12, 14 for housing the fire protection sprinkler; and a hinged arrangement between the first and second ends 12, 14 such that each of the first and second ends 12, 14 of the guard hinge open to receive the fire protection sprinkler into the internal space and hinge close to enclose the sprinkler. The guard 10 is preferably a cylindrical structure and more preferably a substantially circular cylindrical structure with two or more guard portions 10*a*, 10*b* in a hinged arrangement. More preferably, the guard 10 includes two guard portions 10*a*, 10*b* in the hinged arrangement that pivot with respect to one another about a pivot axis H-H that extends parallel to the central guard axis X-X. As shown, the preferred guard 10 is hinged axially from the first end 12 to the second end 14 with a hinged connection 16, and more preferably a group of hinge connections 16, operating about the hinge axis H-H to pivot the two guard portions with respect to one another. The preferred hinge configuration operates to flexibly receive the sprinkler 100 which may be installed in an operative condition affixed to a fluid supply pipe FP, as schematically shown, that is filled with a firefighting fluid under fluid pressure. The hinged connections 16 individually and collectively define an open state of the guard 10 for receipt of the fire protection sprinkler 100 and a closed state for surrounding and guarding the fire protection sprinkler 100. In addition, the preferred sprinkler guard 10 includes a latched configuration in which a latch 18, more preferably a group of latches 18, operate in combination with the preferred hinge connections 16 to surround and enclose the sprinkler 100 within the guard 10 and form a preferably rigid cage structure to shield and protect the sprinkler 100 from lateral impact. The guard 10 can define an alternate geometry such as, for example conical, provided the conical guard can provide for the hinged operation to define the closed and open states of the sprinkler.

In the closed configuration of the sprinkler guard 10 about the sprinkler 100, the first end 12 of the sprinkler guard 10 is preferably configured to engage the sprinkler frame 110 in a manner that centers the sprinkler 100 within the guard 10 and substantially coaxially aligns the sprinkler axis S-S with the guard axis X-X. The second end 14 of the guard 10 is preferably open ended with the second end 14 preferably configured to circumscribe the fluid deflection member 120 of the sprinkler 100 thereby minimizing or eliminating interference with the spray coming off the deflection member 120 upon actuation of the sprinkler 100.

Figure 2:
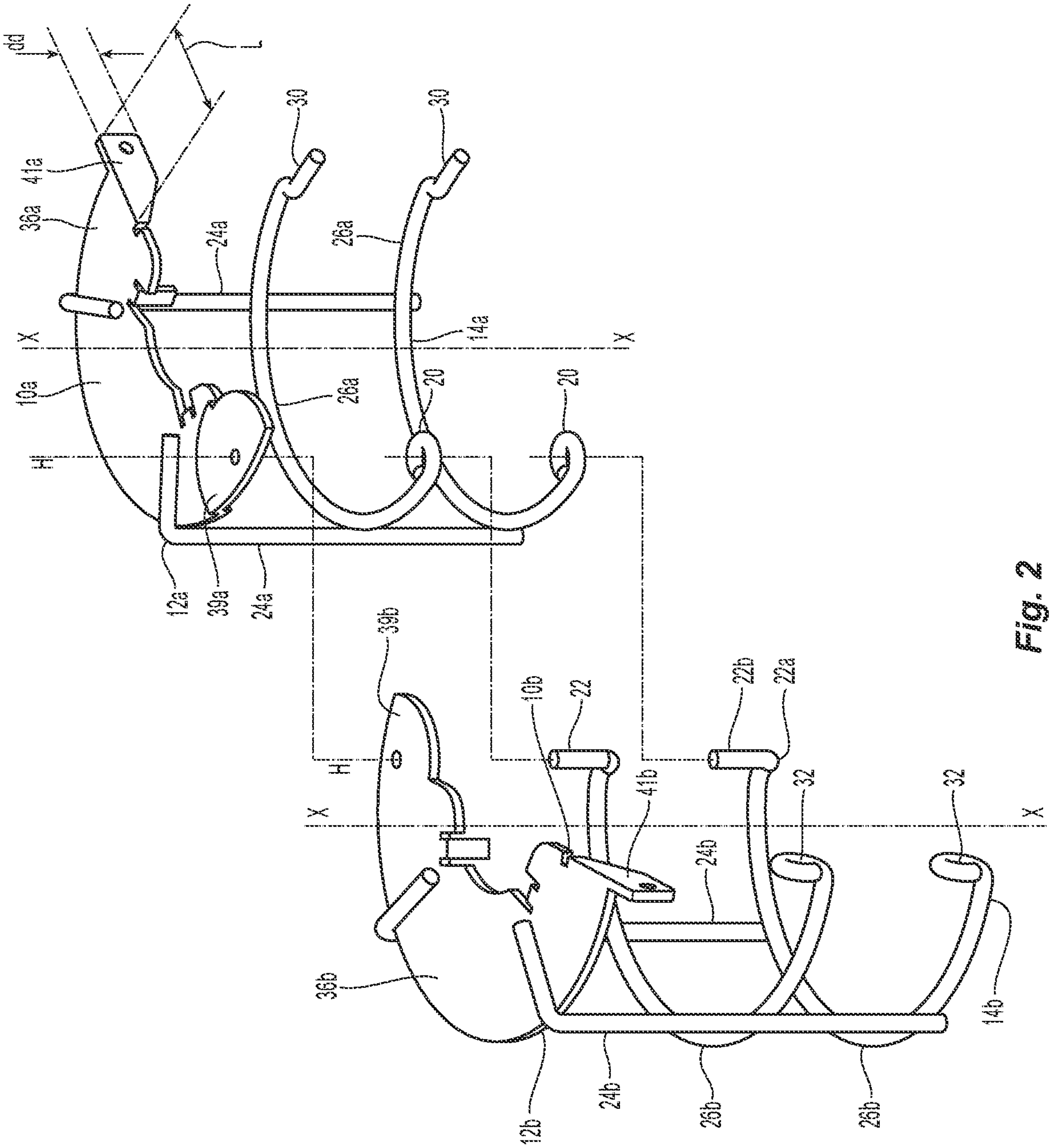
FIG. 2 is an exploded view of the sprinkler guard of FIG. 1.

Generally, the hinge connection 16 between the guard portions 10*a*, 10*b* are provided by respective interlocking elements of the guard portions 10*a*, 10*b*. Shown in FIG. 2 is an exploded view of the preferred sprinkler guard 10 and its two portions 10*a*, 10*b*. The first guard portion 10*a* has a first end 12*a* and a second end 14*a* axially spaced from the first end 12*a*. A group of closed loop formations or eyelets 20 are preferably axially aligned with one another between the first and second ends 12*a*, 14*a* of the first guard portion 10*a*. The second guard portion 10*b* has a first end 12*b* and a second end 14*b* axially spaced from one another. The second guard portion 10*b* preferably includes a group of peg formations or pins 22 that are axially aligned with one another between the first and second ends 12*b*, 14*b* of the second guard portion 10*b*. In the preferred embodiment of the sprinkler guard assembly 10 shown, each of the eyelets 20 is engaged by one of the plurality of pins 22 to form the preferred hinged connections 16 of the guard 10. The hinged connections 16 are radially spaced from and extend parallel to the central guard axis X-X.

A preferred embodiment of the pin 22 is preferably elongated and oriented to extend along the hinge axis H-H parallel to the guard central axis X-X. In a preferred aspect, each of the pins 22 includes a base 22*a* that is affixed and more preferably integrally formed with the rest of the second guard portion 10*b*. Each pin 22 preferably includes a free end 22*b* opposite the base 22*a* to engage a corresponding eyelet 20 of the first guard portion 10*a*. In addition, the pins 22 are preferably oriented with the free end 22*b* above the base 22*a*. The eyelets 20 of the first guard portion 10*a* are preferably formed and oriented such that the geometric opening and center of the eyelets 20 are aligned to circumscribe the hinge axis H-H for coaxial receipt of the elongate pins. The interlocking elements 20, 22 can define alternative configurations provided the interlocking elements can provide a hinge connection as described herein. The pin 22 can include one or more bends, for example as shown in phantom in the hinge connection 16 of FIG. 1, with the free end 22*b* bent perpendicular to the remainder of the pin 22. Further in the alternative, instead of the linear pin received in an eyelet, the interlocking elements can include two non-linear elements engaged with one another to form hinged rotation about a hinge axis H-H.

Dimensionally, the preferred pins 22 are preferably narrower than the openings defined by the respective eyelets 20. Moreover, the pins 22 define a preferred axial length between the base 22*a* and free end 22*b* that is greater than the axial height or thickness of the eyelets 20. The dimensional differences between the preferred pins 22 and the eyelets 20 and their respective orientations provide for flexibility in assembly and operation of the guard 10. Each of the first and second guard portions 10*a*, 10*b* are formed and fabricated from wire and more preferably from cold drawn steel wire. A preferred gauge (A.S.W) of the wire ranges from 7-10 of which the wire diameter can range from 0.125 inch to 0.177 inch. Accordingly, the pins 22 have a preferred diameter that ranges from 0.125 inch to 0.177 inch and the pins 22 are preferably formed to axial length of about ½ inch, preferably ranging from 0.45 inch to 0.5 inch. The wire is preferably looped to form the eyelets 20 with an eyelet width or internal diameter that preferably ranges from 0.15 inch to 0.18 inch with the axial thickness equivalent to that of the wire ranging from 0.125 inch to 0.177 inch. In preferred embodiments of the guard 10, the ratio of external diameter-to-internal diameter ranging from 1.03:1 to 1.5:1. In another preferred aspect, the ratio of pin length-to-eyelet axial thickness ranges from 4:1 to 3:1.

In assembling the preferred sprinkler guard 10, the eyelets 20 slide over the pins 22 in a downward direction under the force of gravity and are vertically restrained by the base 22*a*. With the pins 22 of the second guard portion 10*b* being of a diameter that is less than that of the receiving eyelets 20 of the first guard portion 10*a*, the two guard portions 10*a*, 10*b* can freely rotate with respect to one another about the hinge axis H-H with minimal to no binding. This flexibility in the hinge operation can facilitate installation of the guard 10 about an installed sprinkler as described herein.

The preferred wire construction of each of the first and second guard portions 10*a*, 10*b* form one half of the cage sprinkler guard 10. In preferred embodiments, each of the first and second guard portions 10*a*, 10*b* include a grid of wire members including at least two vertical members 24*a*, 24*b* extending parallel to the guard axis X-X and a group of arcuate members 26*a*, 26*b* interconnecting the at least two vertical members 24*a*, 24*b*. The wire members 24, 26 are preferably affixed to one another by appropriate means including, for example, spot welding. The arcuate members 26 are preferably disposed perpendicular to the adjoining vertical members so that each arcuate member 26 partially circumscribes the sprinkler guard axis X-X and more preferably spans 180 degrees about the guard axis. In each of the first and second guard portions 10*a*, 10*b*, the arcuate members 26*a*, 26*b* preferably define a common radius of curvature so that in the closed state of the guard 10, the arcuate members 26*a*, 26*b* define the preferred cylindrical bounds of the guard 10. In the preferred formation of the hinge connections 16, one or more of the arcuate members 26*a* of the first guard portion 10*a* have one end configured with the preferred eyelet 20. In one or more of the arcuate members 26*b* of the second guard portion 10*b*, one end is configured with the preferred pin 22 for engagement with an eyelet 20 of the first guard portion 10*a* to form the preferred hinged connections 16.

With the hinge connections 16 formed, the sprinkler guard 10 can operate between its open and closed states. In a preferred aspect of the guard 10, the first and second guard portions 10*a*, 10*b* form a preferred frictional engagement that renders the first guard portion 10*a* rigidly affixed with respect to the second portion 10*b* in the closed state of the guard 10. With reference to FIG. 1, preferred embodiments of the sprinkler guard 10 include a latch and more preferably a group of latch connections 18 diametrically opposed to the hinge connections 16 to join the first and second guard portion 10*a*, 10*b* and provide a rigidity to the guard structure. The plurality of latch connections 18 of the guard 10 are preferably axially aligned with one another parallel to the guard axis X-X diametrically opposite the hinged connections 16. Preferably, the latch connections 18 are formed by an engagement between a second set of pin members 30 and eyelets 32. Referring again to FIG. 2, two or more of the arcuate members 26*a* of the first guard portion 10*a* are configured with a preferred latch pin 30 at the end opposite the eyelet 20. In two or more of the arcuate members 26*b* of the second guard portion 10*b*, the end opposite the pin 22 is configured with an eyelet 32 for engagement with one of the latch pins 30 of the first guard portion 10*a* to form the latch connections 18. Alternatively, the parts can be reversed with the eyelets 32 formed on the arcuate members of the first guard portion 10*a* and the latch pins formed on the second guard portion 10*b*. Moreover, the latch connections 18 can be formed by differently configured interlocking members provided the resulting latch connection joins the two guard portions 10*a*, 10*b* together so at to securely maintain the sprinkler guard 10 in the closed state.

Figure 3A:
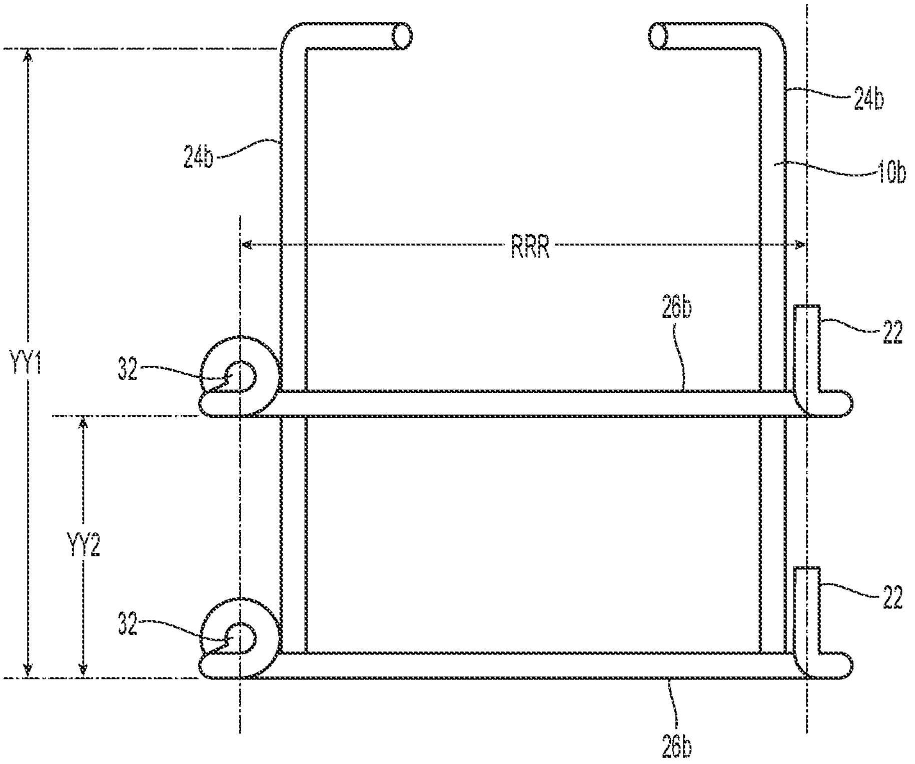
FIG. 3A is one guard portion for use in the sprinkler guard of FIG. 1.
Figure 3B:
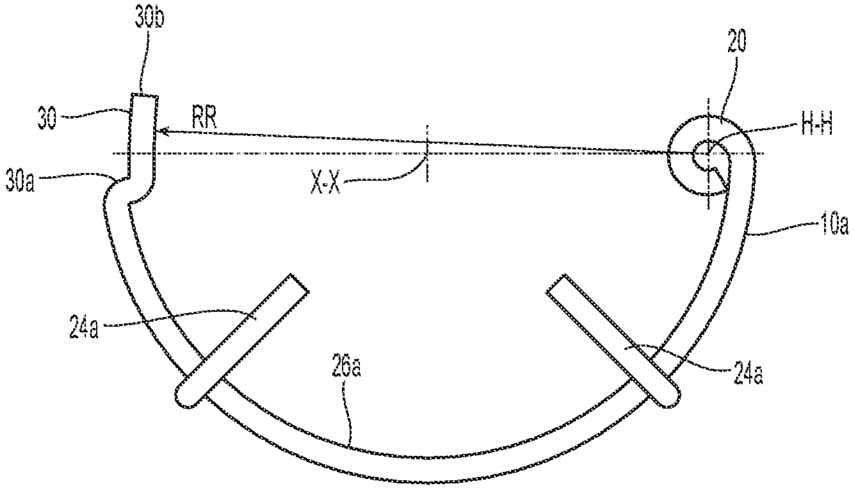
FIG. 3B is another guard portion for use with the guard portion of FIG. 3A and the sprinkler guard of FIG. 1.

With reference to FIG. 3B, in the first guard portion 10*a*, each latch pin 30 is preferably elongated and oriented to be skewed and more preferably orthogonal with respect to the hinge axis H-H and the central guard axis X-X. In a preferred aspect, each of the latch pins 30 includes a base 30*a* that is affixed and more preferably integrally formed with the rest of the preferred arcuate member 26*a*. Each latch pin 30 includes a free end 30*b* opposite the base 30*a* to engage a corresponding eyelet 32 of the second guard portion 10*a*. In addition, the latch pins 30 are preferably radially located at a radial distance RR from the hinge axis H-H so that the latch pins 30 form a frictional engagement with the eyelets 32. The eyelets 32 of the second guard portion 10*b*, shown in FIG. 3A, are preferably formed and oriented such that the geometric opening of the eyelet 32 is sufficiently exposed to the free end 30*b* of the latch pin 30 to receive the latch pins 30 and form the preferred frictional engagement. Dimensionally, the latch pins 30 are preferably narrower than the openings defined by the respective eyelets 32 to form the latch connections 18. Upon receipt within the eyelet 32, the latch pin is preferably axially offset so as to contact the inner surface of the eyelet and form the preferred frictional engagement. Alternatively or additionally, the latch pin 30 can contact or rest against the bottom or lowest point along the inner surface of the eyelet. In one preferred embodiment, the radial distance RRR of the latch eyelet 32 from the hinge axis H-H, shown in FIG. 3A, is greater that the radial distance RR between the latch pin 30 and the hinge axis H-H, shown in FIG. 3B. By forming a frictional engagement, the first and second guard portions 10*a*, 10*b* become rigidly engaged with respect to one another in the closed configuration of the sprinkler guard 10. The preferred latch connections 18 can be used with alternate hinge configurations 16. For example, the preferred latch connections 18 can be used with a single hinge connection 16 located diametrically opposed to the latch connections 18 to provide a rigid closed configuration of the sprinkler guard 10.

With reference to FIG. 1, the first and second guard portions 10*a*, 10*b* respectively include a first end plate 36*a* and a second end plate 36*b* at their respective first ends 12 for cooperatively engaging the sprinkler frame 110 in the closed state of the sprinkler guard 10. Generally, the end plates 36*a*, 36*b* together circumscribe the central guard axis X-X to form a centralized opening through which the sprinkler body protrudes for connection to a fluid supply pipe. The end plates 36*a*, 36*b* are preferably affixed to respective vertical members 24 of the first and second guard portions so that the substantially planar end plates are disposed generally perpendicular to the central axis X-X.

The end plates 36*a*, 36*b* cooperate with one another to form one or more of a hinged connection 38 or a latch connection 40. In a preferred embodiment, the end plates include a hinged connection 38 axially aligned with the hinge axis H-H and a latch connection 40 that is aligned with the latch connections 18 joining the first guard portion 10*a* to the second guard portion 10*b*. Each of the connections 38, 40 can be formed by joining axially aligned through holes formed in the end plates 36*a*, 36*b* with an appropriate mechanical fastener such as, for example, a rivet, a threaded fastener or a bolt and nut assembly. The inclusion of a hinge connection 38 and a latch connection 40 adds stability to the overall guard assembly 10. In particular, the hinge connection 38 adds another hinge connection at the first end 12 of the sprinkler guard 10 to stabilize the assembly during opening and closing operation of the guard. Moreover, in forming the preferred hinge connection 38, a portion of the first end plate 36*a* and a portion of the second end plate 36*b* overlap one another to form a preferred sliding engagement between the end plates 36*a*, 36*b*. In the preferred embodiments shown in FIGS. 1 and 2, the first end plate 36*a* includes a semi-circular shelf 39*a* that overlaps a correspondingly formed quarter circle formation 39*b* to engage the shelf 39*a* in a rotational surface engagement about the hinge axis H-H. In a preferred aspect, the amount of overlap between the end plates 36*a*, 36*b* is preferably about 15%-20% of the surface area of any one of the end plates 36*a*, 36*b*.

The latch connection 40 reinforces and adds rigidity to the closed state of the sprinkler guard 10. In the preferred embodiment of the guard 10 shown in FIGS. 1 and 2, each of the end plates 36*a*, 36*b* include an angled formation 41*a*, 41*b* that mate and cooperate with one another to form the latch connection 40. Each of the mating surfaces of the angled formations 41*a*, 41*b* are defined by a length L extending radially to the guard axis X-X and a depth dd extending parallel to the guard axis X-X. The length L of the mating surface can be constant over the depth dd of the mating surface or alternately vary over the depth dd of the mating surface. When the mating surfaces of the angled formations 41*a*, 41*b* join one another, the preferably cylindrical guard 10 defines a preferably substantially consistent internal diameter D over the height of the guard 10. In a preferred aspect, the length L of the mating surfaces define a preferred ratio with respect to the internal diameter D in which the ratio of the internal diameter D-to-length L of the mating surface (D:L) preferably ranges 5:1 to 6:1.

Each of the end plates 36*a*, 36*b* include surfaces between the hinge connection 38 and the latch connection 40 that define the central opening in the closed state of the sprinkler guard 10 through which the sprinkler protrudes for connection to a fluid supply pipe. In the closed state of the guard 10, the end plate surfaces contact the sprinkler frame to securely support and coaxially center the sprinkler within the guard and prevent its rotation therein. The supporting surfaces of the end plates 36*a*, 36*b* can include a combination of linear edges, arcuate edges and planar surfaces that contact complimentary surfaces of the sprinkler frame to form a supporting surface engagement. In the closed state of the sprinkler guard 10, each of the end plates 36*a*, 36*b* preferably have central arcuate edges that contact curved surfaces of the sprinkler body. Moreover, each of the end plates 36*a*, 36*b* each preferably include planar tabs disposed about the arcuate edge that extend parallel to the guard axis X-X to contact flat surfaces of the sprinkler frame, for example, located at the wrench flat.

The second end 14 of the sprinkler guard 10 is preferably open ended with no guard structure crossing or traversing the circumscribed area of the second end 14. In preferred embodiments of the sprinkler 100, the second end 14 of the guard 10 consists of two cooperating arcuate members 26*a*, 26*b* having one hinged connection 16 and a latch connection 18 joining the arcuate members 26*a*, 26*b* to one another in the closed state of the guard 10. By providing an open end at the second end 14 of the guard 10, the guard structure avoids or minimizes disruption to the spray pattern from the protected sprinkler.

The sprinkler guard 10 is preferably configured for protection of a pendent-type sprinkler and preferably an installed suppression pendent-type sprinkler. With reference to FIG. 1, the pendent sprinkler 100 and its frame 110 includes a body 102 with a fluid inlet and discharge outlet. Fluid discharged from the body 102 impacts the fluid deflection member 120 to address a fire and/or wet the surrounding area. The sprinkler body 102 is configured for coupling to the supply pipe FP of firefighting fluid such as, for example, water in which the supply pipe is suspended below a ceiling of an area to be protected by the sprinkler 100. The body 102 can include an external thread for connection to a pipe fitting P such as, for example, a tee-fitting or pipe nipple. The body 102 can alternatively be externally configured for connection to a pipe coupling, for example, a grooved coupling. The frame 110 shown includes a pair of frame arms 104 that extends from the body 102 to support the fluid deflection member 120 at a coaxial distance from the sprinkler body 102. The sprinkler 100 can be configured as an automatic sprinkler with a thermally responsive trigger 106 disposed between the frame arms 104 and axially aligned along the sprinkler axis S-S. The trigger can be configured as a thermally responsive soldered mechanical assembly 106 or a frangible thermally responsive glass bulb. Upon thermal actuation of the trigger, a seal is ejected from the sprinkler outlet and firefighting fluid is discharged from the body 102 to impact the fluid deflection member 120 for distribution. The fluid deflection member 120 includes an arrangement of slots about the sprinkler axis S-S to define an angular arrangement of tines about the sprinkler axis S-S. Firefighting fluid delivered to the sprinkler body 102 at an operating pressure of the sprinkler 100 is distributed by the fluid deflection member to provide a sprinkler performance such as, for example, fire suppression or control. In the case of suppression fluid distribution, the firefighting fluid is thrust coaxially downward below the sprinkler from the fluid deflection member 120.

To protect an installed pendent sprinkler 100, the guard 10 is placed in an open state by operation of the hinge connections 16 and wrapped about the sprinkler 100. The guard 10 is preferably oriented, as schematically shown in FIG. 1, about the sprinkler 100 so that the hinge connection 16 and latch connections 18 are aligned in a common plane with the frame arms 104. To enclose the sprinkler 100, the hinge connections 16 are operated to bring the first and second guard portions 10*a*, 10*b* together about the sprinkler 100. The end plates 36*a*, 36*b* are preferably located between the sprinkler body 102 and frame arms 104 to coaxially align the central guard axis X-X with the sprinkler axis S-S leaving the sprinkler body 102 protruding outside the guard 10. The first and second guard portions 10*a*, 10*b* are drawn together to engage the preferred latch pins 30 with the eyelets 32 to form the latch connections 18 and provide a rigid guard assembly 10 about the sprinkler 100.

With the sprinkler 100 enclosed, the preferably cage structure of the guard 10 protects the sprinkler frame 110, the thermally responsive trigger and the fluid deflection member 120 while sufficiently exposing the trigger to the ambient environment to appropriately thermally respond to a fire and/or rise in temperature. The preferably cylindrical guard 10 had an internal diameter D that defines a preferred ratio with respect to the maximum width W of the sprinkler 100 in which the ratio of guard diameter D-to-maximum sprinkler width W (D:W) ranges from 1.4:1 to 1.5:1. The internal space of the guard 10 between the first end 12 and the second end 14 provides sufficient space for housing the operational components of the sprinkler such as, for example, as its thermal trigger to operate and clear the fluid discharge path from the body to the fluid deflection member. In a preferred embodiment, the internal diameter of the closed configuration of the sprinkler guard 10 preferably ranges from 2⅞ inch to 3 inches. The maximum sprinkler width W can be defined by the outer surfaces of the frame arms 104, as illustrated in FIG. 1, or alternatively, the maximum sprinkler diameter W can be defined by the fluid deflection member 120.

In addition, the preferably open second end 14 of the guard 10 defines a preferably unobstructed area axially below the fluid deflection member 120 of the pendent sprinkler 100. With no guard structure in the fluid deflection path of the sprinkler 100, the spray pattern of the sprinkler 100 is unimpeded. Accordingly, for a suppression type pendent sprinkler, in which a component of the fluid spray is thrust axially downward, the preferred open end 14 of the sprinkler guard 10 is desirable. Moreover, to maximize the efficiency of fluid distribution of the protected sprinkler, the guard 10 can be configured so as to locate the fluid deflection member 120 with respect to the wire members forming the guard 10. In a preferred aspect of the guard 10, the engagement with the sprinkler 100 preferably axially locates the fluid deflection member between the axially spaced arcuate members 26. With reference to FIG. 3, either one or both of the height YY1 of the guard 10, as defined by the vertical members 24, and the axial spacing YY2 between the arcuate members 26, is preferably configured so as to locate the fluid deflection member 120 between the axially spaced arcuate members 26. In one preferred embodiment, the height of the guard YY1 is preferably greater than the axial distance Y in the sprinkler 100 defined between the end of the external threads of the body 102 and the fluid deflection member 120 as seen in FIG. 1 so as to locate the fluid deflection member 120 between the axially spaced arcuate members 26.

Embodiments of the sprinkler guard 10 provide preferred methods of protecting a fire protection sprinkler. For example, a preferred method includes obtaining a sprinkler guard 10, as described herein, in which the guard 10 has a first end, a second end and a plurality of hinge connections axially aligned with one another between the first and second ends that operate to define an open state of the sprinkler guard and a closed state of the sprinkler guard. The preferred method further includes providing the sprinkler guard to protect an installed fire protection sprinkler. Obtaining the preferred sprinkler guard 10 can include manufacturing, fabricating or purchasing the guard 10 and preferably providing the guard 10 can include supplying and/or selling the guard 10.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A sprinkler guard having a central guard axis, the sprinkler guard comprising:

a first guard portion having a first end and a second end axially spaced from one another and a first end plate disposed at the first end;

a second guard portion having a first end and a second end axially spaced from one another and a second end plate disposed at the first end; and a hinged connection between the first and second guard portions to define an open state for receipt of a fire protection sprinkler and a closed state for surrounding and guarding the fire protection sprinkler;

wherein in the closed state, the first and second guard portions form a plurality of latch connections radially spaced from and extending parallel to the central guard axis with the first ends of the first and second guard portions circumscribing the central guard axis to define a first end of the sprinkler guard with the first and second end plates disposed for cooperatively engaging a body of the fire protection sprinkler and the second ends of the first and second guard portions circumscribing the central guard axis to define a second end of the guard axially spaced from the first end of the guard; and wherein the first and second end plates include an additional latch connection therebetween that is aligned with the plurality of latch connections.

2. The sprinkler guard of claim 1, wherein the first guard portion includes a plurality of latch pins between the first and second ends of the first guard portion and the second guard portion includes a plurality of eyelets between the first and second ends of the second guard portion, the plurality of latch connections being defined by each of the plurality of eyelets of the second guard portion being engaged by one of the plurality of latch pins of the first guard portion.

3. The sprinkler guard of claim 2, wherein each of the plurality of latch pins engage the plurality of eyelets to form a frictional engagement.

4. The sprinkler guard of claim 3, wherein the latch pins are axially offset from the eyelets.

5. The sprinkler guard of claim 1, wherein the hinged connection includes a plurality of hinged connections axially aligned with and radially spaced from the central guard axis, the plurality of hinged connections and the plurality of latch connections being diametrically opposed from one another.

6. The sprinkler guard of claim 1, wherein each of the first and second guard portions include a grid of wire members including a plurality of vertical members extending parallel to the central guard axis and a plurality of axially spaced apart arcuate members interconnecting the plurality of vertical members, at least two of the arcuate members of the first guard portion being engaged with at least two of the arcuate members of the second guard portion to form the plurality of latch connections.

7. The sprinkler guard of claim 6, wherein in the closed state of the sprinkler guard, a fluid deflection member of the sprinkler received in the sprinkler guard is axially located between the axially spaced apart arcuate members.

8. The sprinkler guard of claim 1, wherein the hinged connection is a first hinged connection, and wherein the first and second end plates include a second hinged connection therebetween that is aligned with the first hinged connection.

9. The sprinkler guard of claim 1, wherein in the closed state of the sprinkler guard, the second end of the sprinkler guard defines an open end that is greater than a maximum width of the sprinkler received in the sprinkler guard.

10. The sprinkler guard of claim 1, wherein in the closed state of the guard, the guard has a constant internal diameter.

11. The sprinkler guard of claim 1, wherein in the closed state of the guard, the guard has a cylindrical cage structure.

12. The sprinkler guard of claim 1, wherein the hinged connection is formed with separate interlocking elements of the first and second guard portions.

13. A sprinkler guard for protection of a fire protection sprinkler, the sprinkler guard comprising:

a first guard portion having a first end and a second end axially spaced from one another, a first end plate disposed at the first end and a first grid of wire members affixed to the first end plate;

a second guard portion having a first end and a second end axially spaced from one another, a second end plate disposed at the first end of the second guard portion and a second grid of wire members affixed to the second end plate;

a first hinged connection between the first grid of wire members and the second grid of wire members to pivot the first and second grids of wire members with respect to one another and define an open state of the sprinkler guard for receipt of the fire protection sprinkler and a closed state of the sprinkler guard to form a cage structure with a central guard axis for surrounding and guarding the fire protection sprinkler; and a second hinged connection between and defined on the first end plate and the second end plate.

14. The sprinkler guard of claim 13, wherein in the closed state, the first and second end plates define a centralized opening centered along the central guard axis for contacting and supporting the fire protection sprinkler and the first and second grid of wire members define an open end of the sprinkler guard for circumscribing the fire protection sprinkler.

15. The sprinkler guard of claim 13, further comprising one or more additional hinged connections between the first grid of wire members and the second grid of wire members, and wherein the first hinged connection and the one or more additional hinged connections are axially spaced apart from one another along a pivot axis extending parallel to the central guard axis and radially spaced apart from the central guard axis.

16. The sprinkler guard of claim 15, wherein each of the first and second grid of wire members includes a plurality of arcuate members axially spaced apart from one another, each arcuate member partially circumscribing the central guard axis in the closed state of the sprinkler guard, the plurality of arcuate members of the first grid of wire members including arcuate members engaged with the plurality of arcuate members of the second grid of wire members to form the first hinged connection and the one or more additional hinged connections.

17. The sprinkler guard of claim 16, wherein, for each of the first and second grid of wire members, the axially spaced apart arcuate members are interconnected to one another by wire members extending parallel to the central guard axis.

18. The sprinkler guard of claim 13, wherein in the closed state, the sprinkler guard includes a latch connection between the first and second grid of wire members.

19. The sprinkler guard of claim 13, wherein in the closed state, the sprinkler guard includes a latch connection between the first and second end plates.

20. A sprinkler guard for protection of a fire protection sprinkler, the sprinkler guard comprising:

a first guard portion having a first cage portion formed with a plurality of first wire members; and a second guard portion having a second cage portion formed with a plurality of second wire members;

wherein:

the first guard portion comprises a first hinge portion;

the second guard portion comprises a second hinge portion configured to engage the first hinge portion along a common hinge axis;

the first guard portion is pivotable relative to the second guard portion about the common hinge axis between an open configuration of the sprinkler guard and a closed configuration of the sprinkler guard; and when the sprinkler guard is in the closed configuration, the sprinkler guard defines an open area within the sprinkler guard that extends along a central axis from a first end of the sprinkler guard, through a second end of the sprinkler guard, and to a location external to the sprinkler guard.

21. The sprinkler guard of claim 20, wherein the first guard portion comprises a first connection portion, the second guard portion comprises a second connection portion, and wherein the first connection portion is engageable with the second connection portion when the sprinkler guard is in the closed configuration.

22. The sprinkler guard of claim 21, wherein:

the first connection portion comprises a first bent portion of one first wire member of the plurality of first wire members, wherein the first bent portion is bent relative to an adjacent portion of the one first wire member; and the second connection portion comprises a second bent portion of one second wire member of the plurality of second wire members, wherein the second bent portion is bent relative to an adjacent portion of the one second wire member.

23. The sprinkler guard of claim 22, wherein the first bent portion comprises a pin, and wherein the second bent portion comprises an eyelet or a loop.

24. The sprinkler guard of claim 20, wherein:

the first hinge portion comprises a first bent portion of one first wire member of the plurality of first wire members, wherein the first bent portion is bent relative to an adjacent portion of the one first wire member; and the second hinge portion comprises a second bent portion of one second wire member of the plurality of second wire members, wherein the second bent portion is bent relative to an adjacent portion of the one second wire member.

25. The sprinkler guard of claim 24, wherein the first bent portion comprises an eyelet or a loop, and wherein the second bent portion comprises a pin.

26. The sprinkler guard of claim 20, wherein:

the first guard portion comprises a first end plate connected to the first cage portion, wherein the first end plate is positionable to receive a portion of the fire protection sprinkler;

the second guard portion comprises a second end plate connected to the second cage portion, wherein the second end plate is positionable to receive a portion of the fire protection sprinkler;

the second end plate is pivotably attached to the first end plate at a pivot axis; and when the sprinkler guard is in the closed configuration, the open area extends from the first end plate and the second end plate, through the second end of the sprinkler guard, and to the location external to the sprinkler guard.

27. The sprinkler guard of claim 26, wherein when the sprinkler guard is in the closed configuration, the first end plate and the second end plate form an opening within a continuous perimeter for surrounding a portion of the fire protection sprinkler.

28. The sprinkler guard of claim 26, wherein:

the first end plate comprises a first connection portion;

the second end plate comprises a second connection portion; and the first connection portion and the second connection portion are engageable at a location that is spaced apart from the pivot axis between the second end plate and the first end plate.

29. The sprinkler guard of claim 20, wherein at least one first wire member of the plurality of first wire members is oriented transversely relative to the hinge axis.

30. The sprinkler guard of claim 20, wherein the plurality of first wire members forms a grid.

31. A sprinkler guard for protection of a fire protection sprinkler, the sprinkler guard comprising:

a first guard portion comprising a first wire cage portion connected to a first end plate; and a second guard portion comprising a second wire cage portion connected to a second end plate; wherein:

the first wire cage portion is pivotable relative to the second wire cage portion;

the first end plate is pivotable relative to the second end plate via a hinged connection between the first end plate and the second end plate;

the first guard portion moves relative to the second guard portion between an open state of the sprinkler guard for receipt of a fire protection sprinkler and a closed state of the sprinkler guard for surrounding and guarding the fire protection sprinkler; and a portion of the first end plate overlaps a portion of the second end plate to form the hinged connection.

32. The sprinkler guard of claim 31, wherein the first wire cage portion is pivotable relative to the second wire cage portion via one or more eyelets of the first wire cage portion receiving one or more pins of the second wire cage portion, and wherein the sprinkler guard further comprises one or more releasable connections for releasably holding the sprinkler guard in the closed state.

* * * * *